United States Patent
Iacenda

(10) Patent No.: US 11,820,230 B2
(45) Date of Patent: Nov. 21, 2023

(54) DASHBOARD UNIT WITH ADJUSTABLE INCLINATION FOR A MOTORCYCLE

(71) Applicant: DUCATI MOTOR HOLDING S.P.A., Bologna (IT)

(72) Inventor: Luca Iacenda, Bologna (IT)

(73) Assignee: DUCATI MOTOR HOLDING S.P.A., Bologna (IT)

( * ) Notice: Subject to any disclaimer, the term of this patent is extended or adjusted under 35 U.S.C. 154(b) by 44 days.

(21) Appl. No.: 17/503,722

(22) Filed: Oct. 18, 2021

(65) Prior Publication Data

US 2022/0134882 A1 May 5, 2022

(30) Foreign Application Priority Data

Oct. 30, 2020 (IT) .......................... 102020000025837

(51) Int. Cl.
*B60K 37/00* (2006.01)

(52) U.S. Cl.
CPC .......... *B60K 37/00* (2013.01); *B60K 2370/84* (2019.05); *B60K 2370/87* (2019.05)

(58) Field of Classification Search
CPC .......... B60K 37/00; B62J 11/00; B60R 11/00
USPC ...................... 296/7; 224/420, 441, 443, 545
See application file for complete search history.

(56) References Cited

U.S. PATENT DOCUMENTS

| | | | | |
|---|---|---|---|---|
| 8,998,048 B1 * | 4/2015 | Wu | .......................... | F16M 13/02 |
| | | | | 224/443 |
| 9,961,306 B1 * | 5/2018 | Lev | .......................... | H04R 1/028 |
| 10,189,525 B2 | 1/2019 | Allen | | |
| 10,330,251 B2 * | 6/2019 | Carnevali | ............. | F16M 13/022 |
| 2011/0233249 A1 * | 9/2011 | Nakajima | .............. | B62J 50/225 |
| | | | | 224/545 |
| 2013/0292296 A1 * | 11/2013 | Kang | ...................... | H04M 1/04 |
| | | | | 206/775 |
| 2014/0168890 A1 * | 6/2014 | Barnard | ................ | G06F 1/1626 |
| | | | | 248/181.2 |

FOREIGN PATENT DOCUMENTS

DE 102016122518 A1 5/2018

OTHER PUBLICATIONS

Search Report and Written Opinion dated Jun. 23, 2021 for Italian patent application No. 10202000025837 filed on Oct. 30, 2020.

* cited by examiner

*Primary Examiner* — Amy R Weisberg
*Assistant Examiner* — Sunsurraye Westbrook
(74) *Attorney, Agent, or Firm* — Vorys, Sater, Seymour and Pease LLP; Anthony P. Venturino

(57) ABSTRACT

A dashboard unit for a motorcycle includes a dashboard and a support element for the dashboard, which element is integral with, and secured on, a front part of the motorcycle vehicle. A movable support for the dashboard is placed between the fixed support element for the dashboard and the dashboard, the movable support for the dashboard being secured on the dashboard, a unit being provided for adjustment of the inclination of this movable support for the dashboard, which unit is interposed between the dashboard and the fixed support element for the dashboard, the adjustment unit including a cam unit which cooperates with the movable support for the dashboard, in order to vary the inclination of the dashboard.

9 Claims, 5 Drawing Sheets

DASHBOARD UNIT WITH ADJUSTABLE INCLINATION FOR A MOTORCYCLE

This claims the benefit of Italian patent application no. 102020000025837, filed Oct. 30, 2020.

The subject of the present invention is a dashboard unit for a motorcycle according to the preamble of the main claim.

As is known, a dashboard is usually associated with a front part of a motorcycle, which part is connected to the handlebar. This dashboard comprises a display unit on which information relating to the vehicle and its speed is shown.

The dashboard is usually integral with a support element which secures it on the front part of the vehicle.

Although this dashboard is often usually partly protected by a small dome which is connected to the front part of the motorcycle, it may happen that reflections are generated on the display unit thereof, which reflections can be annoying and/or dangerous for the driver. Furthermore, the height of the driver can also be the cause of an imperfect view of the display, the position of which is fixed on the vehicle in such a way that it can be adapted to an average height of the driver.

The objective of the present invention is to provide a dashboard unit comprising the support element secured on the vehicle and the dashboard itself provided with its display unit, which dashboard unit is improved in comparison with the known dashboard units.

In particular, the objective of the invention is to provide a dashboard unit wherein the display unit is always legible in an optimum manner by the driver, whatever his height may be.

Another objective is to provide a dashboard unit wherein the display unit is always legible in an optimum manner, and completely independently from the light which exists in the environment where the motorcycle is moving.

These objectives and others, which will become apparent to persons skilled in the art, are achieved by a dashboard unit according to the appended main claim.

For better understanding of the present invention, purely by way of non-limiting example, the following drawings are appended, in which.

Figure 1:
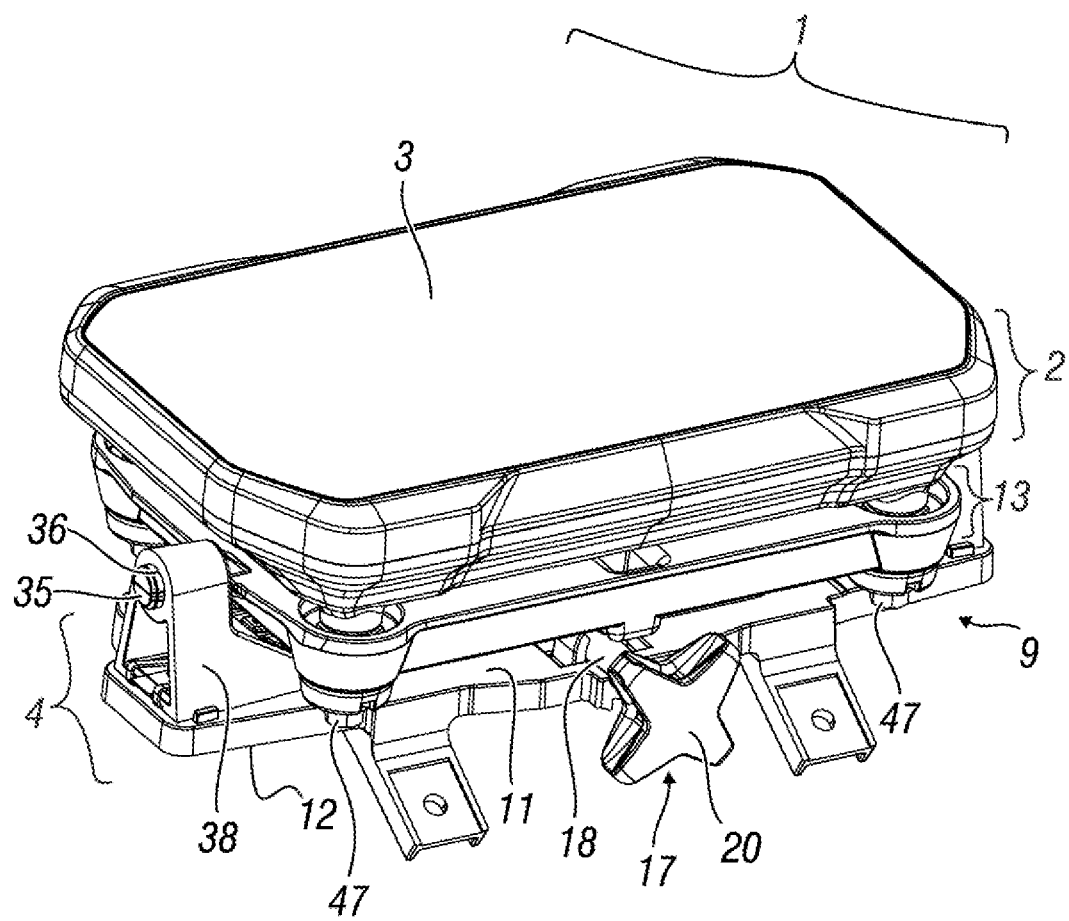
FIG. 1 shows a front view in perspective of a dashboard unit according to the invention.
Figure 2:
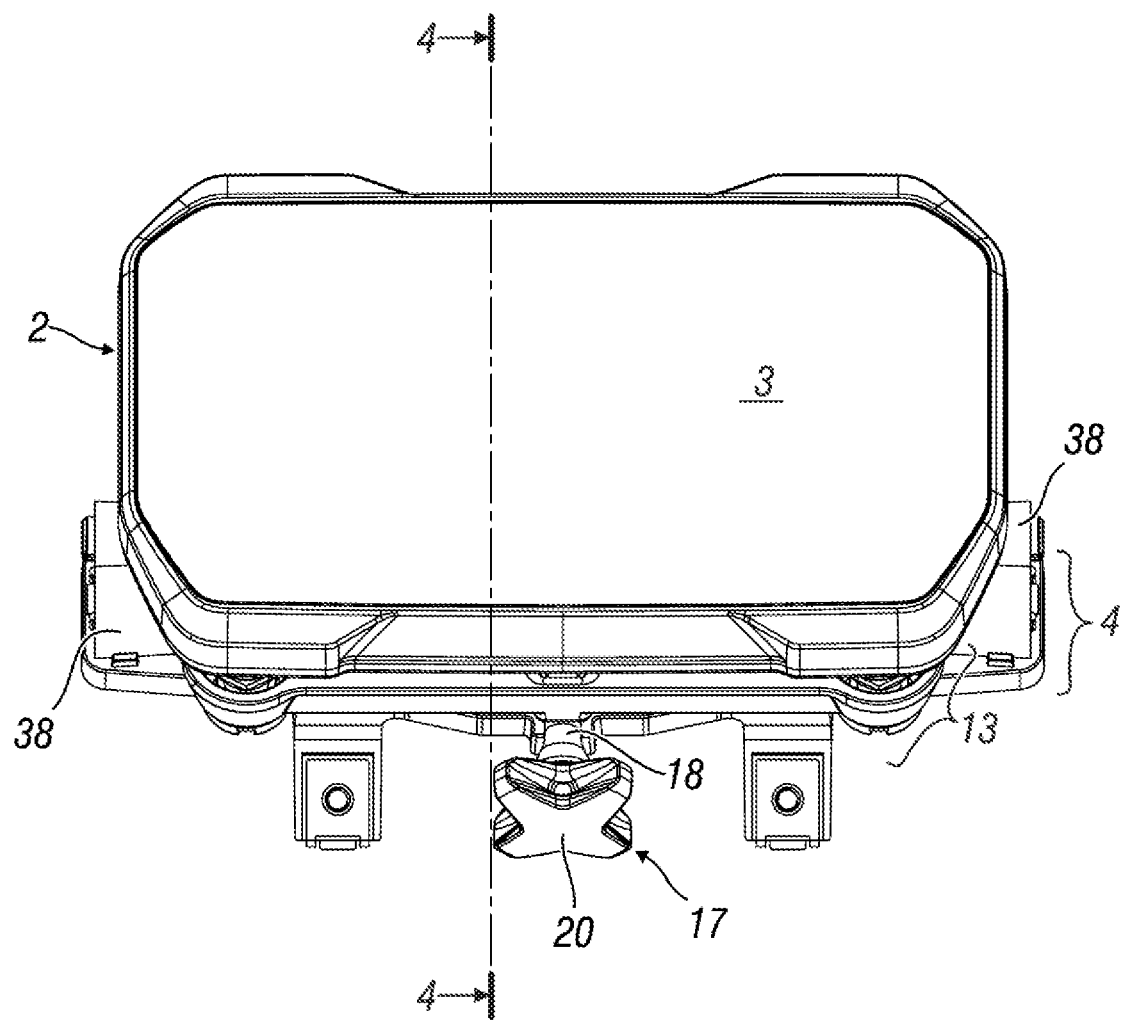
FIG. 2 shows a view from above of the dashboard unit in FIG. 1.
Figure 3:
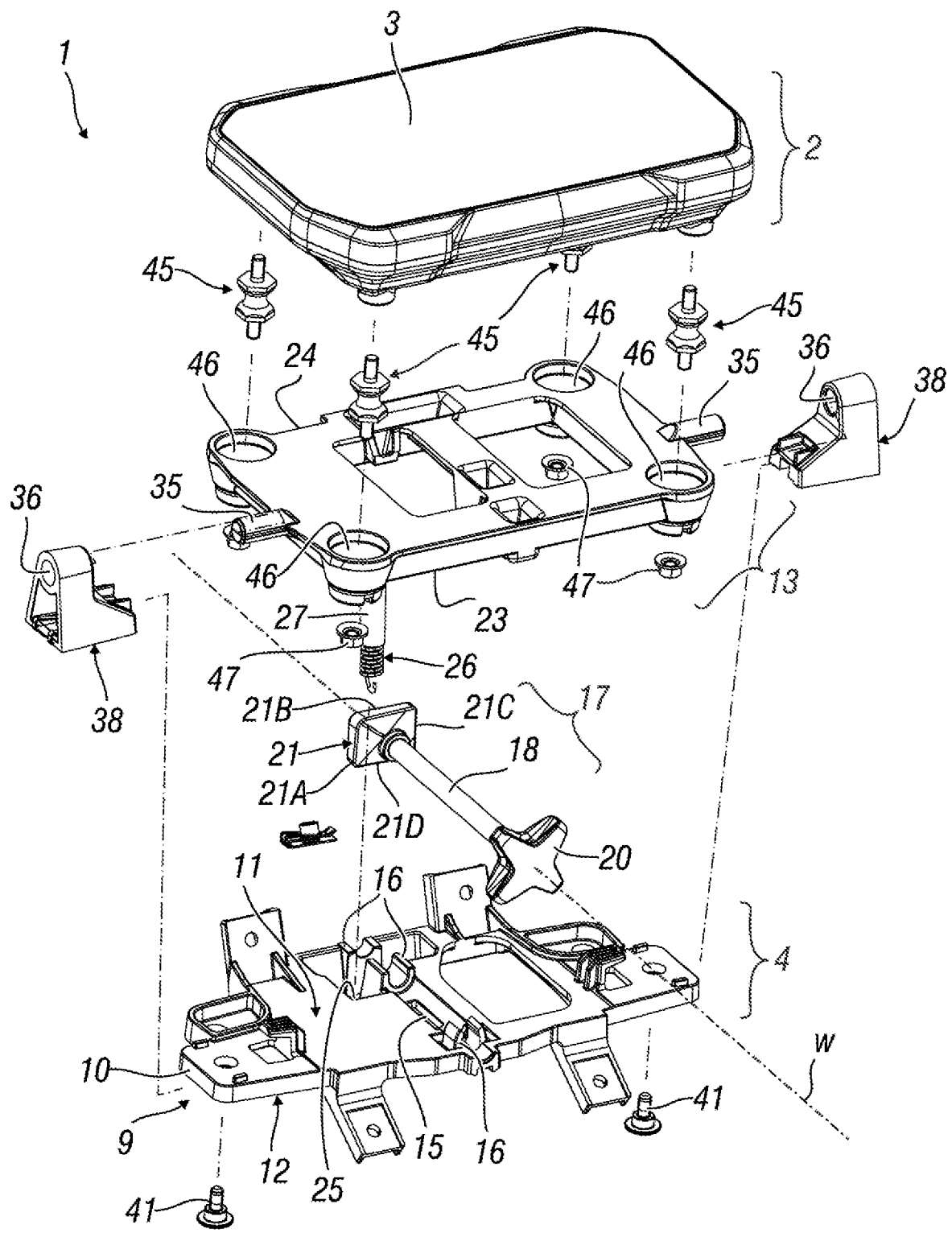
FIG. 3 shows an exploded front view in perspective of the dashboard unit in FIG. 1.
Figure 4:
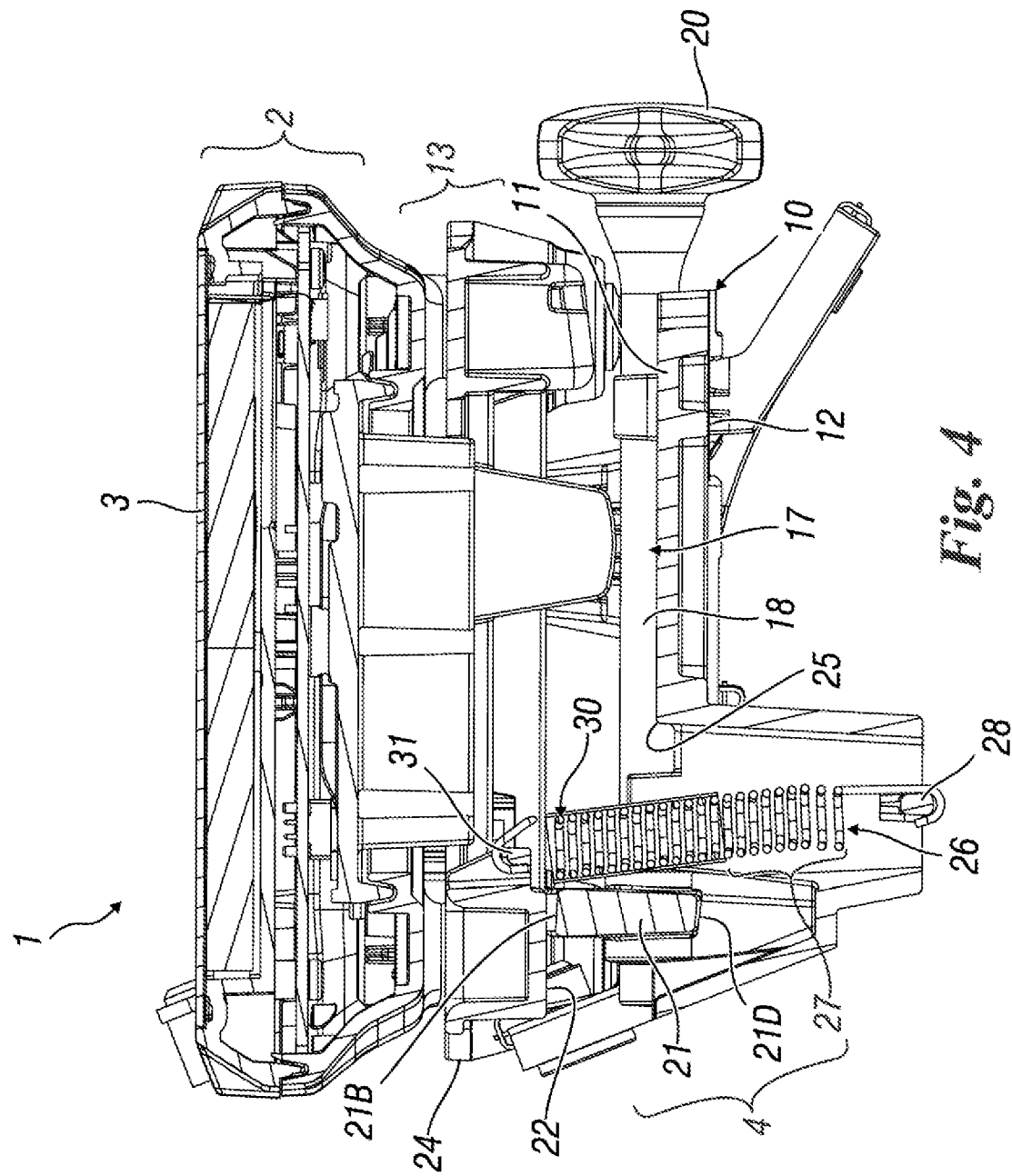
FIG. 4 shows a cross-section along the line 4-4 in FIG. 2.
Figure 5:
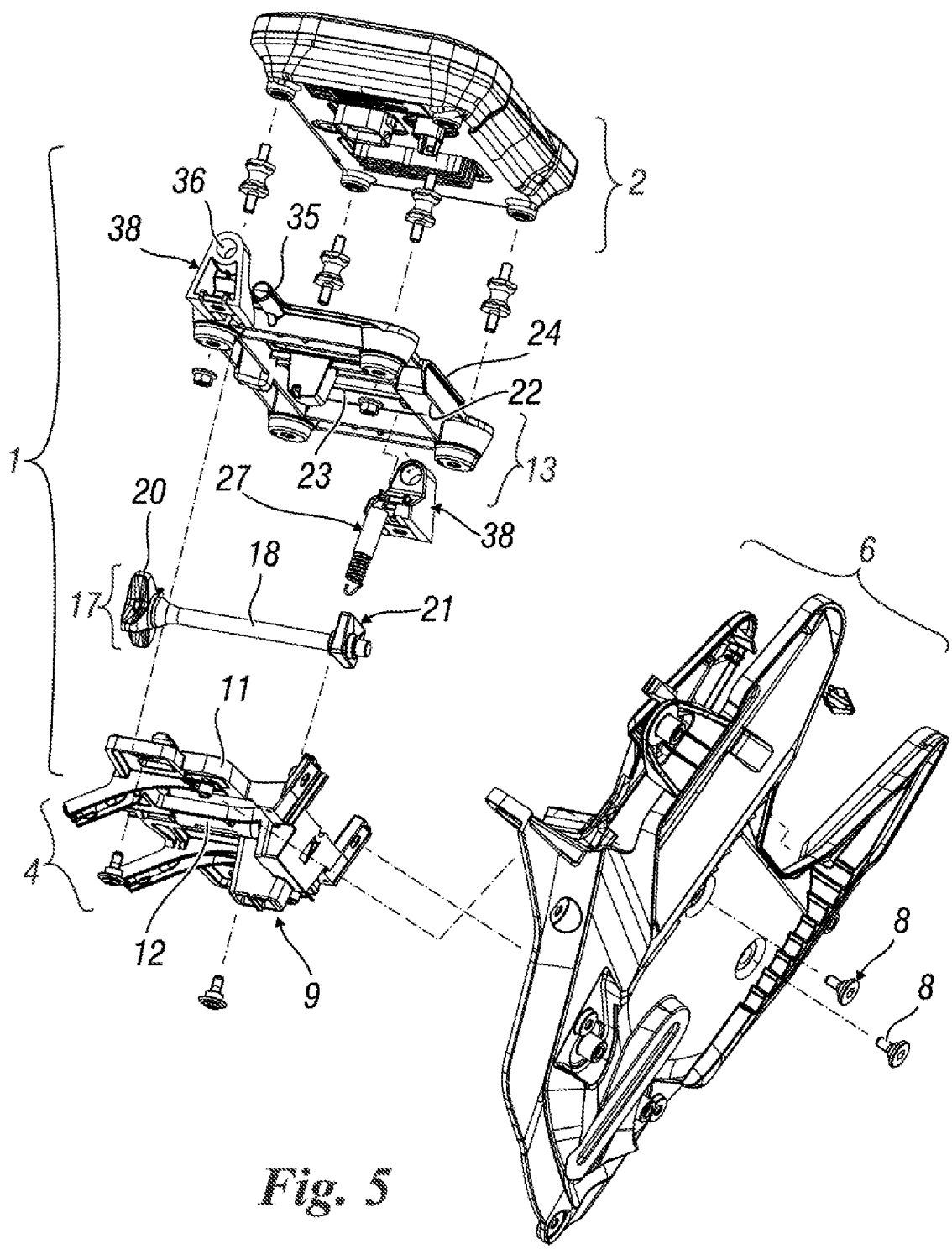
FIG. 5 shows an exploded view in perspective from below of the dashboard in FIG. 1 and part of the motorcycle on which the dashboard is secured.

With reference to the figures, a dashboard unit for a motorcycle is generally indicated as 1, and comprises an actual dashboard 2, with a display unit 3 which can show the driver various pieces of information during use of the vehicle (for example its speed) and an element 4 for support of this dashboard, which is secured in any known manner on a front part of the vehicle 6 (not shown), with which the handlebar of the motorcycle is associated. In the example in the figures, the dashboard unit 1 is secured, by means of the element 4 for support of the dashboard, on a part 6 of the motorcycle which supports a conventional small dome (not shown) by means of connection units 8 (for example screws).

The fixed support element 4 for the dashboard comprises a body 9 with a substantially flat part 10, which, with reference to the figures, has an upper face 11 and a lower face 12. The dashboard 2 is placed at the upper face 11 in such a way that the display unit 3 is legible by the driver.

The dashboard 2 is integral with a support 13 for the dashboard which is interposed between the dashboard 2 and the fixed support element 4 for the dashboard, and faces the aforementioned upper face 11. This support 13 for the dashboard is movable, and can adopt different inclinations in relation to the fixed support element 4, such as to make it possible to incline the dashboard and thus the display unit 3, so as to prevent reflections thereon which could prevent the driver from reading correctly and/or completely what is being displayed thereon. The inclinability of the dashboard also makes it possible to adapt the spatial position thereof according to the height of the driver.

More particularly, the fixed support element 4 for the dashboard has on its upper face 11 a recess or seat 15 from which there rise arched elements 16 which can retain a unit for adjustment of the inclination of the dashboard 2. This unit 17 comprises a rod 18 which can be partly contained in the aforementioned seat or recess 15, and can be retained, such as to rotate around its own longitudinal axis W, by the arched elements 16.

At a first, proximal end (i.e. an end which is close to, or facing towards the driver), the rod 18 bears a knob 20 (or an equivalent control element), and at its second, distal end (distant from the driver) it bears a cam unit 21 which can cooperate directly with a stop 22 provided in a distal position (i.e. distant from the driver), on a side 23 of the movable support 13 for the dashboard which faces the fixed support element 4 for the dashboard.

The rotation of the rod 18 around the axis W brings different parts of the cam unit 21 into contact with the stop 22, and modifies the inclination of the movable support 13 for the dashboard, and thus of the dashboard 2 integral therewith, which inclination leads to raising of a distal side 24 of this support 13 of the fixed support element 4 for the dashboard.

More particularly, the cam unit 21 is a body with a polygonal edge (in the example it is an irregular parallel-epiped body, but it can also be regular), connected eccentrically to the rod 18 (i.e. the rod 18 is not connected to the geometric centre of the cam unit 21). The cooperation thereof with the stop 22 makes it possible to obtain various inclinations of the dashboard, as indicated above.

In the upper face 11 of the fixed support 4 for the dashboard, in a distal position in relation to the driver, there is a recess 25 into which a first end 26 of a traction spring 27 penetrates. This end 26 is connected to a cross-member 28 provided in said recess 25. The other end 30 (the second end) of the spring 27 is on the other hand connected to a cross-member 31 which is integral with the movable support 13 for the dashboard, in the vicinity of the distal side 24 (distant from the driver). This spring 27 thus opposes every movement of said distal side 24 away from the fixed support element 4 for the dashboard, caused by the rotation of the rod 18 around the axis W, with consequent contact of one of the sides 21A, 21B, 21C, 21D of the cam unit 21 with the stop 22 of the movable support 13 for the dashboard. These sides have different distances from the face 11 of the fixed support 4 for the dashboard, because of the eccentric connection of the unit 21 to the rod 18.

Said movement takes place thanks to the rotation of opposite pins 35 which project laterally from the movable support for the dashboard (i.e. in a direction orthogonal to the axis W), within seats 36 of hinge units 38 which rise from, and are secured on, the upper face 11 of the part 10; this rotation arises when the knob 20 is rotated, and thus the rod 18 is rotated around the axis W.

In the example in the figures, the hinge units 38 are autonomous elements, which are secured, for example by means of screws 41, on said face 11 of the part 10 of the fixed support element 4 for the dashboard.

Finally, the dashboard 2 is secured on the movable support 13 for the dashboard by means of screws and damping elements 45, inserted in seats 46 provided in said support 13, where they cooperate with nuts 47.

Thanks to the invention, the driver can adjust the inclination of the dashboard 2 relative to the fixed support element 4 at any time when driving, in order to avoid any light reflections (for example of the sun) on the display unit 3. In addition, depending on his own height, the driver can also adjust the position of the dashboard 2 such as to put the display unit 3 into a position in which it can easily be read.

All of this is carried out by acting on the knob 20, rotating the rod 18, and bringing one of the sides 21A,B,C,D of the cam unit 21 into contact with the stop 22 of the movable support 13 for the dashboard. Thanks to the fact that the rod 18 is eccentric in relation to the geometric centre of this cam unit 21, even if this unit were a regular parallelepiped body, the rotation thereof and contact with the stop 22 could however give rise to differentiated raising of the distal side 24 of said movable support 13 from the fixed support element 4 for the dashboard. On the other hand, if the rod 18 were coupled to the cam unit 21, exactly in the geometric centre thereof, the inclinability of the dashboard 2 could be obtained by producing said cam unit 21 with an irregular edge or profile, such as to permit a plurality of inclinations of the dashboard.

It will be appreciated that the cam unit can have a plurality of polygonal forms, such as to permit a corresponding plurality of inclined positions of the dashboard 2 in relation to the fixed support element 4.

The traction spring 27 opposes this movement, and retains the movable support for the dashboard integrally with the fixed support element 4.

A dashboard unit thus produced permits adjustment of the inclination of the dashboard using means which are economical, but functional and ergonomic. The adjustment can easily be obtained by the driver even with a single hand. This adjustment increases the safety of use of the vehicle, since it prevents annoying and dangerous reflections of light on the display unit 3, and increases the comfort of use of the motorcycle, since it makes it possible to adapt the position of the display unit 3 to various heights of the users/drivers.

The invention claimed is:

1. A dashboard unit for a motorcycle comprising:
   a dashboard and
   a fixed support element for the dashboard, which element is integral with, and secured on, a front part of the vehicle or a motorcycle,
   a movable support for the dashboard placed between the fixed support element for the dashboard and the dashboard, said movable support for the dashboard being secured on the dashboard,
   an adjustment unit being provided for adjustment of the inclination of this movable support for the dashboard, which adjustment unit is interposed between said dashboard and the fixed support element for the dashboard,
   said adjustment unit comprising a cam unit which cooperates with the movable support for the dashboard, in order to vary the inclination of the dashboard,
   wherein said movable support for the dashboard is hinged on the fixed support element for the dashboard, and is connected to this fixed support element by a resilient return unit secured on connection elements which are present in a distal position on said fixed support element for the dashboard and said movable support for the dashboard.

2. The dashboard unit according to claim 1, the fixed support element for the dashboard retains the adjustment unit.

3. The dashboard unit according to claim 1, wherein said adjustment unit is adapted and configured to rotate around an axis (W) of the adjustment unit, to rotate said cam unit, said cam unit being able to adopt various relative positions in relation to the movable support of the dashboard, in order to vary the inclination thereof.

4. The dashboard unit according to claim 3, wherein the adjustment unit has a control element for control of the rotation of said adjustment unit around the axis (W) of the adjustment unit.

5. The dashboard unit according to claim 2, wherein the adjustment unit comprises a rod which is associated with a seat provided in a face of the fixed support element for the dashboard, which fixed support element faces said movable support for the dashboard, said rod bearing at a first, proximal end the control element for control of the rotation of said rod around a longitudinal axis (W) of said rod, and bearing at a second end the cam unit.

6. The dashboard unit according to claim 4, wherein the control element is adapted and configured to face a driver of the motorcycle.

7. The dashboard unit according to claim 1, wherein said movable support for the dashboard has opposite pins which project laterally, and are adapted and configured to cooperate with hinge units secured on the fixed support element for the dashboard, said return unit being a traction spring.

8. The dashboard unit according to claim 5, wherein hinge units are secured on the face of the fixed support element for the dashboard, which support faces the movable support for the dashboard, said hinge units rising from this face and having seats for said pins.

9. The dashboard unit according to claim 7, wherein the hinge units are secured on the face of the fixed support element for the dashboard, which support faces the movable support for the dashboard, said hinge units rising from this face and having seats for said pins.

* * * * *